US009821632B2

(12) United States Patent
Wiedemann et al.

(10) Patent No.: US 9,821,632 B2
(45) Date of Patent: Nov. 21, 2017

(54) METHOD FOR CONTROLLING THE REFRIGERANT PRESSURE IN AN AMBIENT HEAT EXCHANGER OF A REFRIGERANT CIRCUIT

(71) Applicant: Bayerische Motoren Werke Aktiengesellschaft, Munich (DE)

(72) Inventors: Stefan Wiedemann, Munich (DE); Oliver Horn, Munich (DE); Martin Knott, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 116 days.

(21) Appl. No.: 14/692,261

(22) Filed: Apr. 21, 2015

(65) Prior Publication Data

US 2015/0224852 A1    Aug. 13, 2015

Related U.S. Application Data

(63) Continuation of application No. PCT/EP2013/070307, filed on Sep. 30, 2013.

(30) Foreign Application Priority Data

Oct. 22, 2012 (DE) .................. 10 2012 219 168

(51) Int. Cl.
*B60H 1/00* (2006.01)
*B60H 1/32* (2006.01)
*B60H 1/22* (2006.01)

(52) U.S. Cl.
CPC ..... *B60H 1/00899* (2013.01); *B60H 1/00785* (2013.01); *B60H 1/321* (2013.01);
(Continued)

(58) Field of Classification Search
CPC B60H 1/00785; B60H 1/321; B60H 1/00899; B60H 2001/3245;
(Continued)

(56) References Cited

U.S. PATENT DOCUMENTS 5,704,217 A    1/1998  Itoh et al.
6,422,062 B1 *  7/2002  King .................. B60H 1/00785
                                            62/150

(Continued)

FOREIGN PATENT DOCUMENTS

CN       1436979 A       8/2003
DE    696 29 659 T2      6/2004
(Continued)

OTHER PUBLICATIONS

Chinese Office Action issued in counterpart Chinese Application No. 201380041373.7 dated Jan. 29, 2016 with English translation (12 pages).

(Continued)

*Primary Examiner* — Mohammad M Ali
(74) *Attorney, Agent, or Firm* — Crowell & Moring LLP

(57) ABSTRACT

A method of controlling the refrigerant pressure in an ambient heat exchanger of a refrigerant circuit, particularly a heat pump circuit, for vehicles, in which the current temperature and the current humidity of the ambient air is measured, the current dew point temperature of the ambient air is determined from the measured temperature and humidity, and if the ambient air temperature is below 0° C. the refrigerant pressure in the refrigerant circuit is controlled by adjusting the rotational speed of a refrigerant compressor of the refrigerant circuit, the flow cross-section of a controllable expansion element of the refrigerant circuit and/or the ambient air volume flow flowing around or through the ambient heat exchanger, such that the temperature of the (Continued)

ambient heat exchanger is greater than the dew point temperature.

4 Claims, 1 Drawing Sheet

(52) U.S. Cl.
CPC .......... *B60H 2001/224* (2013.01); *B60H 2001/2271* (2013.01); *B60H 2001/2296* (2013.01); *B60H 2001/3245* (2013.01); *B60H 2001/3258* (2013.01); *B60H 2001/3261* (2013.01); *B60H 2001/3272* (2013.01); *B60H 2001/3277* (2013.01); *B60H 2001/3282* (2013.01); *B60H 2001/3285* (2013.01)

(58) Field of Classification Search
CPC .... B60H 2001/3258; B60H 2001/3261; B60H 2001/3272; B60H 2001/2296; B60H 2001/3282; B60H 2001/3285; B60H 2001/224; B60H 2001/2271; B60H 2001/3277
USPC .............................................. 62/80, 98, 244
See application file for complete search history.

(56) References Cited

U.S. PATENT DOCUMENTS

| | | | | |
|---|---|---|---|---|
| 6,668,917 | B1* | 12/2003 | Zeng | B60H 1/00785 165/202 |
| 6,966,197 | B2* | 11/2005 | Itoh | B60H 1/00392 62/160 |
| 2002/0166332 | A1* | 11/2002 | Kelly | B60H 1/3207 62/176.6 |
| 2004/0134217 | A1* | 7/2004 | Itoh | B60H 1/00392 62/324.1 |
| 2004/0177630 | A1* | 9/2004 | Umebayashi | B60H 1/00842 62/186 |
| 2005/0045322 | A1* | 3/2005 | Yoshida | B60H 1/00785 165/202 |
| 2005/0121185 | A1* | 6/2005 | Yonekura | B60H 1/00785 165/202 |
| 2007/0221371 | A1* | 9/2007 | Ichikawa | B60H 1/00785 165/204 |
| 2009/0293512 | A1 | 12/2009 | Miura | |
| 2012/0240607 | A1* | 9/2012 | Misumi | B60H 1/3207 62/126 |

FOREIGN PATENT DOCUMENTS

| | | |
|---|---|---|
| DE | 10 2010 025 779 A1 | 1/2011 |
| EP | 1 334 851 A2 | 8/2003 |
| FR | 2 963 278 A1 | 2/2012 |
| JP | 11-287538 A | 10/1999 |
| JP | 2004-198027 A | 7/2004 |

OTHER PUBLICATIONS

International Search Report (PCT/ISA/210) dated Jan. 7, 2014, with English translation (Five (5) pages).
German Office Action dated Jul. 19, 2013 (Four (4) pages).
Chinese Office Action issued in counterpart Chinese Application No. 201380041373.7 dated Sep. 26, 2016 with English translation (eight pages).

* cited by examiner

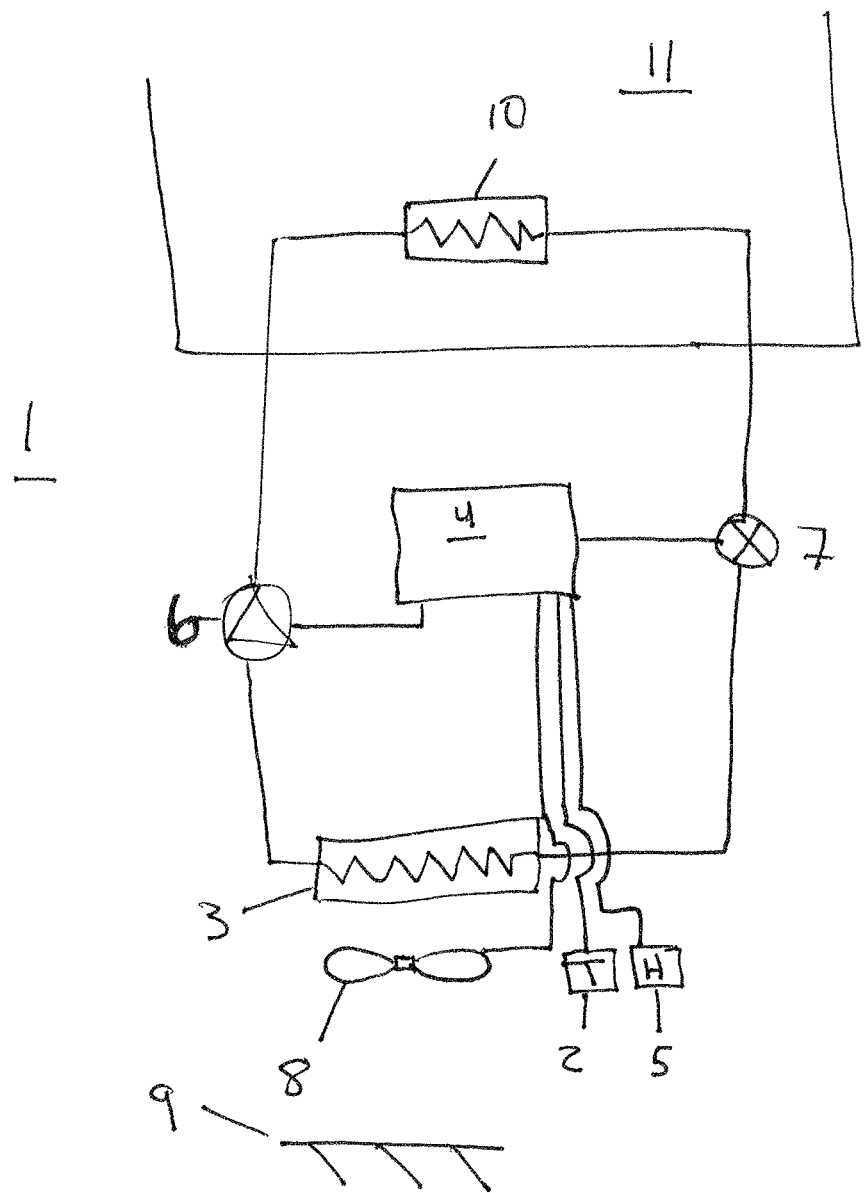

METHOD FOR CONTROLLING THE REFRIGERANT PRESSURE IN AN AMBIENT HEAT EXCHANGER OF A REFRIGERANT CIRCUIT

CROSS REFERENCE TO RELATED APPLICATIONS

This application is a continuation of PCT International Application No. PCT/EP2013/070307, filed Sep. 30, 2013, which claims priority under 35 U.S.C. §119 from German Patent Application No. 10 2012 219 168.2, filed Oct. 22, 2012, the entire disclosures of which are herein expressly incorporated by reference.

BACKGROUND AND SUMMARY OF THE INVENTION

The present invention relates to a method for controlling refrigerant pressure in an ambient heat exchanger of a refrigerant circuit, in particular in a heat pump circuit of a vehicle.

In the case of hybrid and electric vehicles, refrigerant circuits operable as a heat pump are increasingly considered for heating and/or air-conditioning or for cooling the passenger compartment or individual components of the vehicle. Refrigerant circuits operated as a heat pump absorb heat from the ambient air by an ambient-air heat exchanger. Under certain operating conditions, there is the risk of icing of the ambient-air heat exchanger, which would lead to a failure or to a significant reduction of the heating power of the heat pump circuit.

It is an object of the invention to control a refrigerant circuit in such a manner that icing of the ambient heat exchanger is prevented.

The starting point of the invention is the recognition that the danger of icing of the ambient heat exchanger will exist only when a) the current dew point temperature of the ambient air is below 0° C., and b) the temperature of the ambient heat exchanger or the vaporization temperature in the ambient heat exchanger is below the current dew point temperature.

The dew point temperature of the ambient air is a function of the ambient air temperature and of the humidity of the ambient air, which may be indicated as the relative air moisture φ or as absolute humidity x.

The basic idea of the invention consists of determining or estimating the current dew point temperature of the ambient air by measuring or determining the temperature of the ambient air and by measuring or by determining the humidity of the ambient air.

BRIEF DESCRIPTION OF THE DRAWING

FIG. 1 is a schematic illustration of a refrigerant circulating system in accordance with an embodiment of the present invention.

DETAILED DESCRIPTION

FIG. 1 schematically illustrates an embodiment of a refrigerant system 1 in accordance with the present invention. The temperature of the ambient air can be measured by a temperature sensor 2. The temperature sensor 2 may, for example, be arranged near or directly at the ambient heat exchanger 3 of the refrigerant circuit 1 and may be connected by way of an electric line with an electronic unit 4. The humidity of the ambient air can be measured by a humidity sensor 5 (for example, by a capacitive humidity sensor). The humidity sensor 5 may also be arranged in the area of or near or directly at the ambient heat exchanger 3. The humidity sensor 5 is also connected with the electronic unit 4 by an electric line. An analyzing algorithm implemented in the electronic unit 4 determines the current dew point temperature of the ambient air on the basis of the current temperature of the ambient air and the current humidity of the ambient air.

According to the invention, the refrigerant pressure in the refrigerant circuit 1 when the temperature of the ambient air of less than 0° C. is controlled such that the temperature of the ambient heat exchanger 3 will always be greater than the current dew point temperature, which prevents icing of the ambient heat exchanger 3. The refrigerant pressure in the refrigerant circuit 1 and particularly the refrigerant pressure in the ambient heat exchanger 3 can be "set" by an appropriate adjusting of:

the rotational speed of the refrigerant compressor 6, and/or the flow cross-section of a controllable expansion element 7 of the refrigerant circuit 1, and/or the ambient air volume flow flowing around or through the ambient heat exchanger.

The ambient air volume flow flowing around or through the ambient heat exchanger can be changed by controlling the rotational speed of a fan 8 (for example, an electrically triggered fan) and/or by triggering possibly provided activatable air guiding elements 9.

It may be provided that the humidity sensor 5 supplies an electric signal corresponding to the relative moisture of the ambient air. As an alternative, it may be provided that the humidity sensor 5 supplies an electric signal corresponding to the absolute humidity of the ambient air.

A refrigerant circuit 1, which can be operated as a heat pump, according to the invention, viewed in the flow direction of the refrigerant, has a compressor 6 which pumps compressed refrigerant through a condenser 10. In the condenser 10, the refrigerant provides heat, for example, to air blown into a passenger compartment 11. After flowing through the condenser 10, the refrigerant is relaxed in an expansion element 7 which may, for example, be a controllable expansion element. The relaxed refrigerant will subsequently flow through an ambient heat exchanger 3, in which it absorbs heat from the ambient air. After flowing through the ambient air heat exchanger 3, the refrigerant is again sucked in by the compressor 6.

As mentioned above, a temperature sensor 2 and a humidity sensor 5, by which the ambient air temperature and the humidity of the ambient air respectively can be measured, may be arranged in the area of or directly at the ambient heat exchanger 3. The sensors 2, 5 are connected to an electronic control system 4 (such as an air-conditioning unit), which controls the rotational speed of the refrigerant compressor 6 and/or the flow cross-section of the expansion element 7 and/or the ambient air flow flowing around or through the ambient heat exchanger, particularly such that the refrigerant circuit will be operated at the currently best operating point. As a result, the energy consumption required for the air-conditioning of the vehicle can be reduced, which clearly increases the range of the vehicle, particularly in the case of electric or hybrid vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a refrigerant pressure in an ambient heat exchanger of a refrigerant circuit for vehicles, comprising the acts of:
    measuring a current ambient air temperature with a temperature sensor;
    measuring a current ambient air humidity with a humidity sensor;
    determining a current ambient air dew point temperature from the current ambient air temperature and the current ambient air humidity;
    if the current ambient air temperature is less than 0° C., adjusting the refrigerant pressure in the refrigerant circuit such that a temperature of the ambient heat exchanger is greater than the current ambient air dew point temperature by adjusting at least one of
        a rotational speed of a refrigerant compressor of the refrigerant circuit,
        a flow cross-section of a controllable expansion element of the refrigerant circuit, and
        an ambient air volume flow flowing around or through the ambient heat exchanger.

2. The method according to claim 1, wherein the humidity sensor measures a relative moisture of the ambient air.

3. The method according to claim 1, wherein the humidity sensor measures an absolute humidity of the ambient air.

4. The method according to claim 1, wherein the ambient air volume flow is adjusted by controlling at least one of a rotational speed of a fan assigned to the ambient heat exchanger and a position of at least one air guiding element assigned to the ambient heat exchanger.

* * * * *